United States Patent
Lazur et al.

(10) Patent No.: US 9,249,684 B2
(45) Date of Patent: Feb. 2, 2016

(54) COMPLIANT COMPOSITE COMPONENT AND METHOD OF MANUFACTURE

(71) Applicants: Rolls-Royce Corporation, Indianapolis, IN (US); Rolls-Royce North American Technologies, Inc., Indianapolis, IN (US)

(72) Inventors: Andrew J. Lazur, Huntington Beach, CA (US); Ted J. Freeman, Danville, IN (US); Aaron D. Sippel, Zionsville, IN (US); David J. Thomas, Brownsburg, IN (US); Adam L. Chamberlain, Mooresville, IN (US); Joseph P. Lamusga, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 153 days.

(21) Appl. No.: 14/095,604

(22) Filed: Dec. 3, 2013

(65) Prior Publication Data

US 2014/0363613 A1    Dec. 11, 2014

Related U.S. Application Data

(60) Provisional application No. 61/778,600, filed on Mar. 13, 2013.

(51) Int. Cl.
| | |
|---|---|
| F01D 25/00 | (2006.01) |
| F01D 5/28 | (2006.01) |
| B29C 70/20 | (2006.01) |

(52) U.S. Cl.
CPC .............. *F01D 25/005* (2013.01); *F01D 5/282* (2013.01); *F01D 5/284* (2013.01); *F01D 5/286* (2013.01); *B29C 70/205* (2013.01); *Y02T 50/672* (2013.01); *Y10T 428/24025* (2015.01)

(58) Field of Classification Search
CPC .............................. Y10T 428/24; B32B 3/28
USPC ........................................................... 428/98
See application file for complete search history.

(56) References Cited

U.S. PATENT DOCUMENTS

| | | | |
|---|---|---|---|
| 5,939,216 | A | 8/1999 | Kameda et al. |
| 6,617,013 | B2 | 9/2003 | Morrison et al. |
| 7,181,843 | B1 | 2/2007 | Tabbita et al. |
| 7,200,912 | B2 | 4/2007 | Bouillon et al. |

(Continued)

FOREIGN PATENT DOCUMENTS

| | | | |
|---|---|---|---|
| EP | 2052853 | A2 | 4/2009 |
| EP | 2243701 | A2 | 10/2010 |

(Continued)

OTHER PUBLICATIONS

International Search Report and Written Opinion for International Application No. PCT/US2013/072765, Jul. 23, 2014, 11 pages.

(Continued)

*Primary Examiner* — Brent O'Hern
(74) *Attorney, Agent, or Firm* — Barnes & Thornburg LLP

(57) ABSTRACT

A composite component includes a bonded portion and a component mount. The component mount is coupled to the bonded portion to move relative to the bonded portion. The bonded portion includes a fiber portion and a ceramic portion.

18 Claims, 6 Drawing Sheets

(56) References Cited

U.S. PATENT DOCUMENTS

| | | |
|---|---|---|
| 7,238,247 B2 | 7/2007 | Bouillon et al. |
| 7,258,530 B2 | 8/2007 | Morrison et al. |
| 7,387,758 B2 | 6/2008 | Merrill et al. |
| 7,524,566 B2 | 4/2009 | Bamberg et al. |
| 7,550,107 B2 | 6/2009 | Morrison et al. |
| 7,600,979 B2 | 10/2009 | Steibel et al. |
| 7,754,126 B2 | 7/2010 | Subramanian et al. |
| 7,798,769 B2 | 9/2010 | Keller |
| 7,968,031 B2 | 6/2011 | Carper et al. |
| 8,075,280 B2 | 12/2011 | Jones |
| 8,205,453 B2 | 6/2012 | Conete |
| 8,236,409 B2 | 8/2012 | Morrison et al. |
| 8,357,323 B2 | 1/2013 | Morrison et al. |
| 2002/0066135 A1 | 6/2002 | Tao et al. |
| 2005/0053466 A1 | 3/2005 | Finn et al. |
| 2008/0207075 A1 | 8/2008 | Merrill et al. |
| 2010/0263976 A1 | 10/2010 | Tanaka et al. |
| 2010/0284810 A1 | 11/2010 | Corman et al. |
| 2011/0215502 A1 | 9/2011 | Carper et al. |
| 2013/0004715 A1 | 1/2013 | Jarmon et al. |
| 2013/0011271 A1 | 1/2013 | Shi et al. |
| 2013/0270389 A1 | 10/2013 | Godon et al. |
| 2014/0017074 A1 | 1/2014 | Olivier |

FOREIGN PATENT DOCUMENTS

| | | | |
|---|---|---|---|
| EP | 2540479 A1 * | 1/2013 | ............. B29C 70/24 |
| FR | 2968679 A1 | 6/2010 | |
| FR | 2968679 A1 | 6/2012 | |
| FR | 2972129 A1 | 9/2012 | |
| JP | 2000271736 A | 10/2000 | |

OTHER PUBLICATIONS

International Search Report and Written Opinion, International Application No. PCT/US2013/072765, Jul. 28, 2014, 11 pages.

* cited by examiner

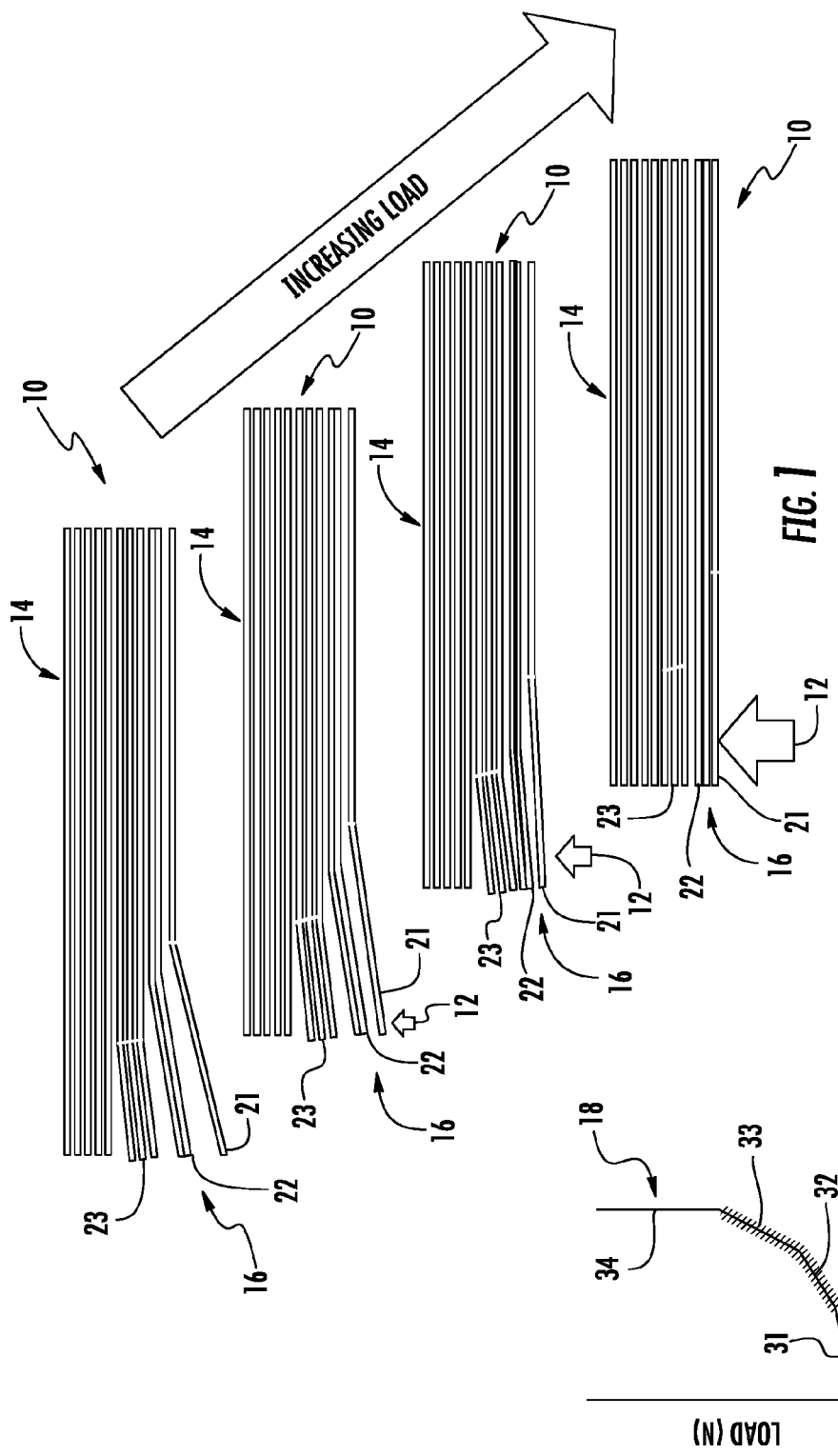

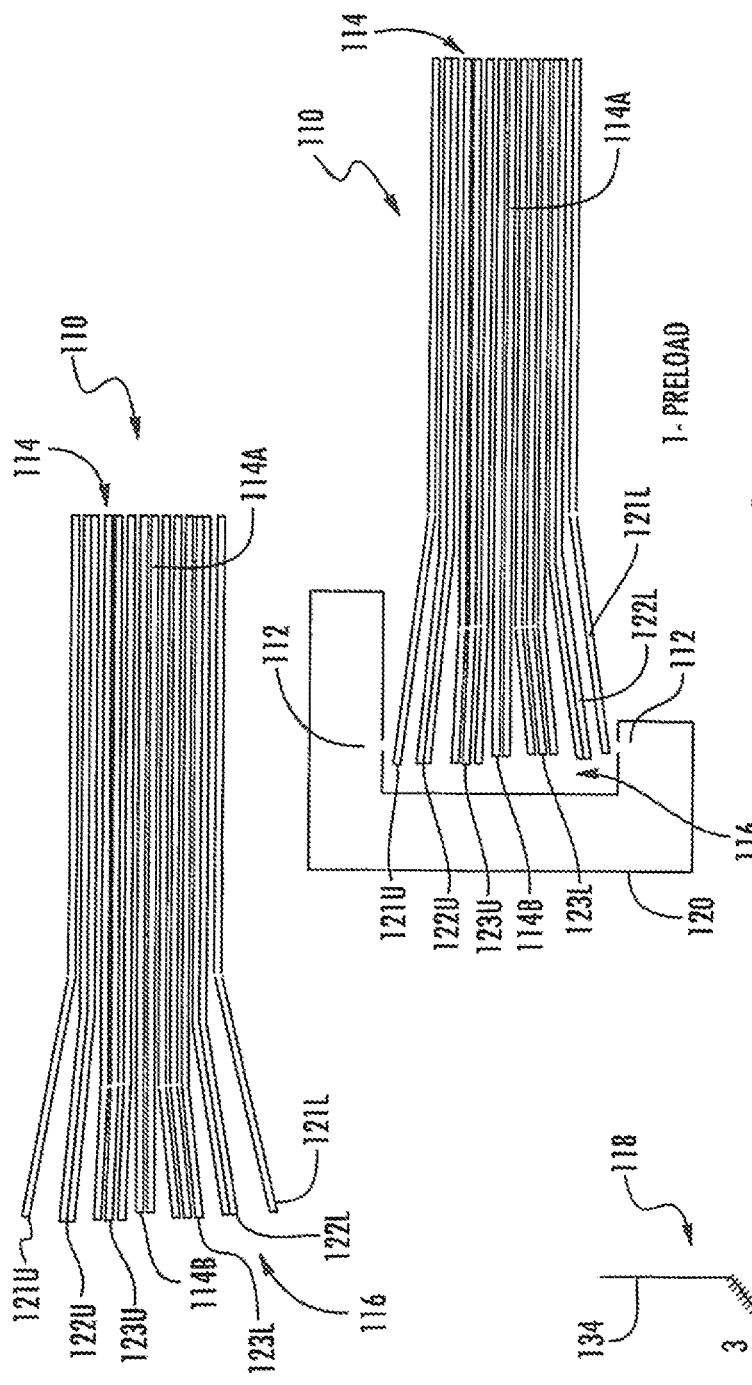
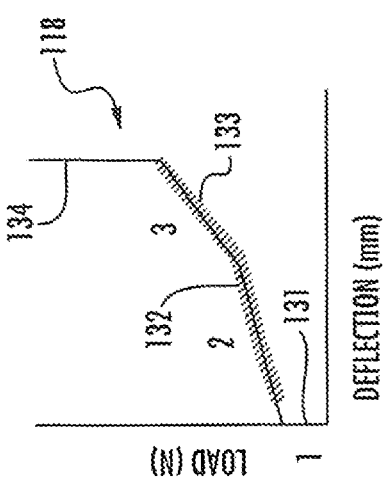
FIG. 3
FIG. 4

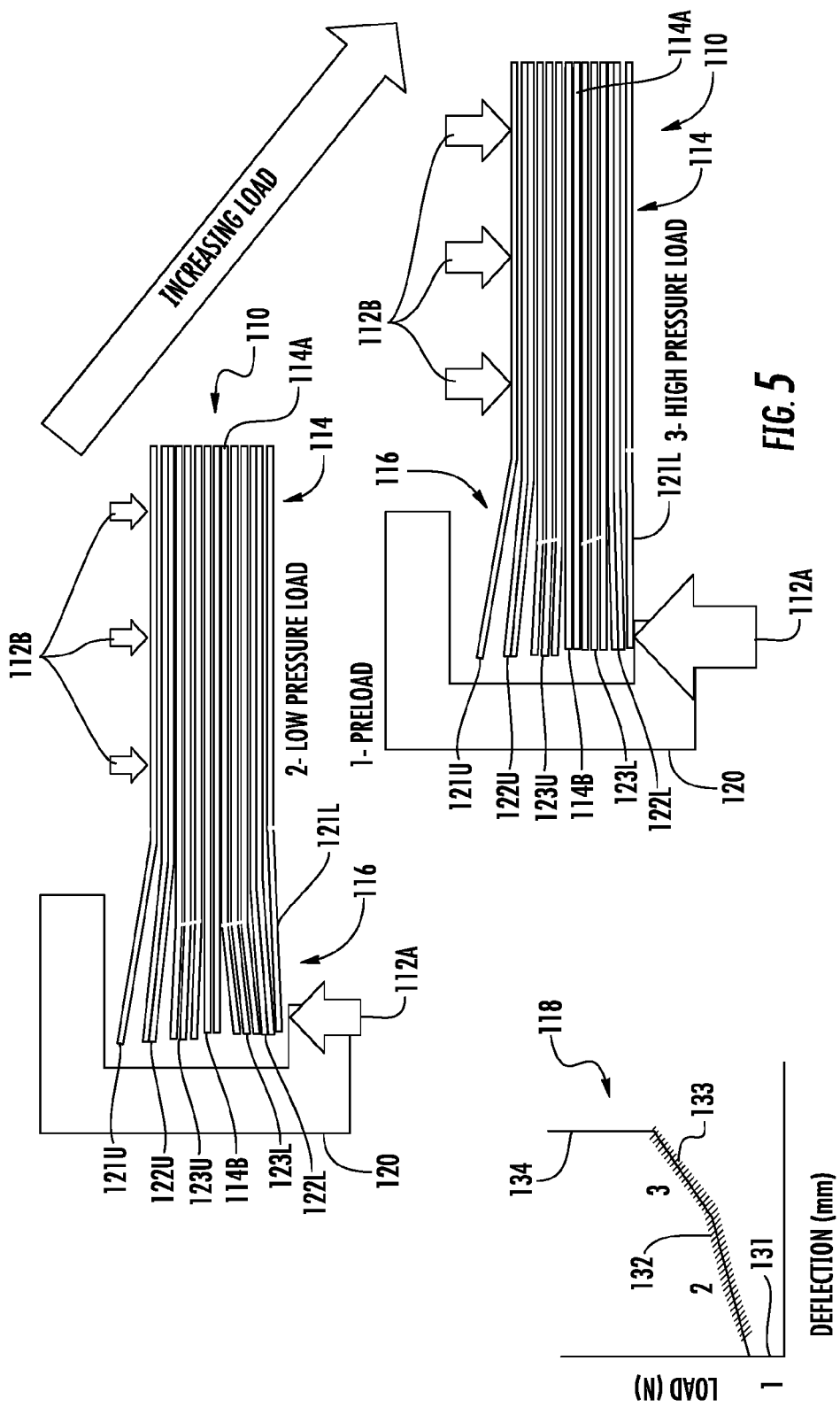

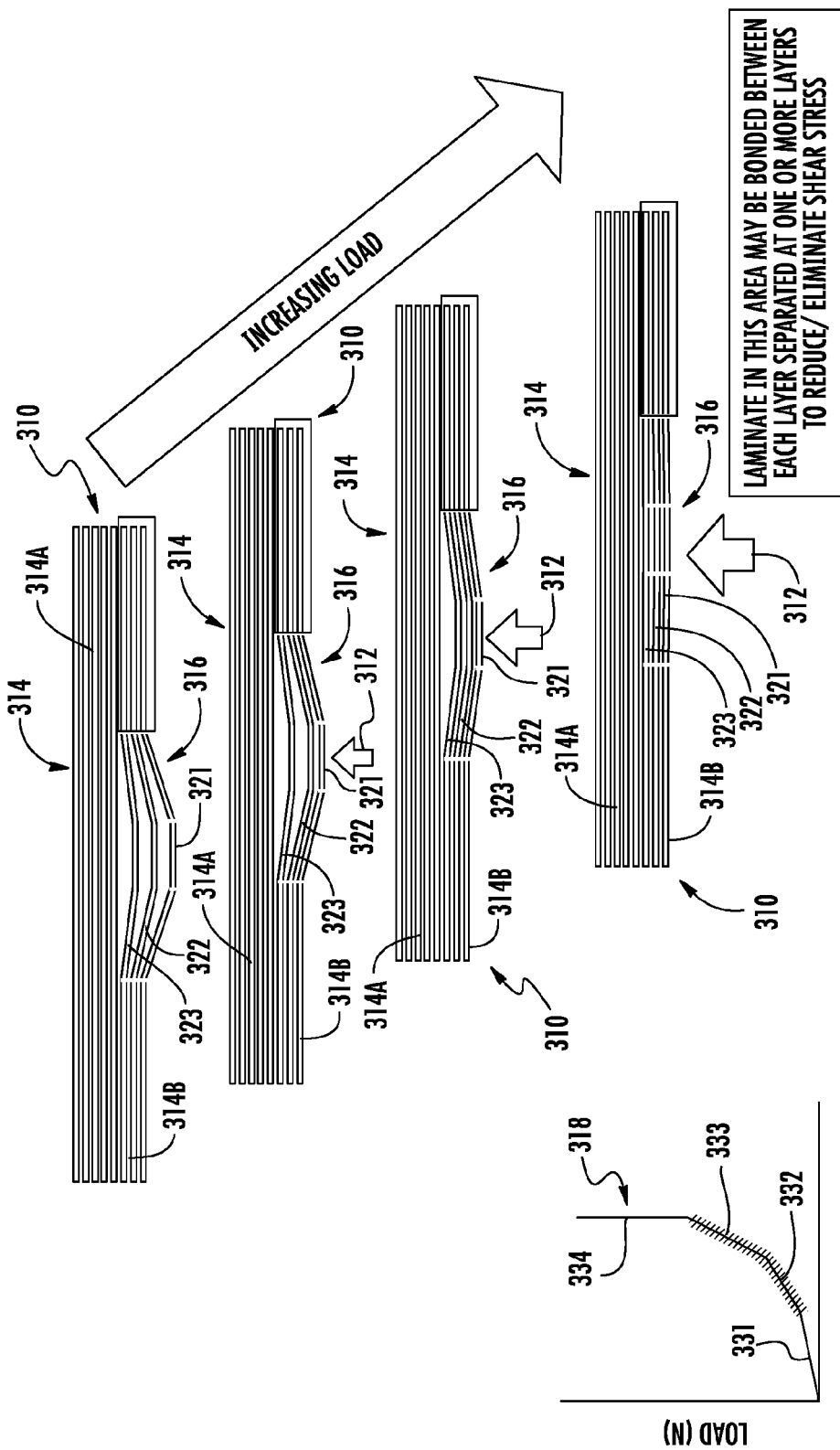

COMPLIANT COMPOSITE COMPONENT AND METHOD OF MANUFACTURE

CROSS REFERENCE TO RELATED APPLICATIONS

This application claims priority to and the benefit of U.S. Provisional Patent Application No. 61/778,600, filed 13 Mar. 2013, the disclosure of which is now incorporated herein by reference.

FIELD OF THE DISCLOSURE

The present disclosure relates generally to composite materials, and more specifically to attachment methods of composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications. As a result, very high working temperatures are experienced by the turbine.

Design of gas turbine engines is driven by many concerns, however, maximizing engine efficiency to minimize costs of operation and environmental impact due to emissions are becoming increasingly important. Gas turbine efficiency is maximized by increasing a maximum operating temperature of the gas turbine engine. As a result, efficiency is limited by the temperature capabilities hot components such as turbine blades, turbine vanes, turbine blade tracks, combustor liners, etc.

Temperature capabilities of hot components may be increased through cooling, materials, and coatings of the components. Some materials, such as nickel-based (Nibased) superalloys have reached an intrinsic limit in high-temperature resistance. As a result, development has focused on Thermal Barrier Coatings (TBC), which may be brittle, and Ceramic Matrix Composite (CMC) materials, which sometimes suffer from load transfer problems.

CMC materials include various components which may include Silicon and Carbide. In one example, SiC/SiC CMC materials may be used in hot section structural components for generation gas turbine engines. SiC/SiC CMC engine components provide desirable high-temperature mechanical properties, high-temperature physical properties, and chemical properties. These desirable properties allow gas turbine engines to operate at relatively higher temperatures than the current engines having superalloy components. SiC/SiC CMC materials also provide the additional benefit of damage tolerance, which monolithic ceramic materials do not possess.

However, combining CMC materials with metal materials has some issues. One issue is that CMC materials often have a different stiffness than metal components in which the CMC materials may be joined to. Another issue is that CMC materials have different Coefficients of Thermal Expansion (CTE) than metal materials they may be joined to. As a result, significant stresses may be result where CMC materials are joined to non-CMC materials.

SUMMARY

The present application discloses one or more of the features recited in the appended claims and/or the following features which, alone or in any combination, may comprise patentable subject matter.

A composite component may include a bonded portion and an un-bonded portion. The bonded portion may be made from a ceramic matrix composite material. The un-bonded portion may be made from the ceramic composite material. The un-bonded portion may be coupled to the bonded portion to move relative to the bonded portion in response to application of a load to cause the composite component to deform in a controlled manner without fracture of the composite component.

In some embodiments, the un-bonded portion may include a first un-bonded section, a second un-bonded portion, and a third un-bonded portion. The first un-bonded portion may be coupled to the bonded portion to move relative to the bonded portion in response to application of the load. The second un-bonded section may be coupled to the bonded portion to move relative to the bonded portion and the first un-bonded section in response to application of the load. The third un-bonded section may be coupled to the bonded portion to move relative to the bonded portion, the first un-bonded section, and the second un-bonded section in response to application of the load.

In some embodiments, the third un-bonded section may be located between the bonded portion and the second un-bonded section. The second un-bonded section may be located between the third un-bonded section and the first un-bonded section.

In some embodiments, the composite component may have a load vs. deflection curve including, in series, a first segment, a second segment, a third segment, and a fourth segment. The first segment may be provided by the first un-bonded section and may have a first slope. The second segment may be provided by the second un-bonded section and may have a second slope. The third segment may be provided by the third un-bonded section and may have a third slope. The fourth segment may be provided by the bonded portion and may have a fourth slope.

In some embodiments, the second slope may be greater than the first slope. The third slope may be greater than the fourth slope. The fourth slope may be greater than the third slope.

In some embodiments, the un-bonded portion may include a first lower un-bonded section, a second lower un-bonded section, and a third lower un-bonded section. The first lower un-bonded section may be coupled to the bonded portion to move relative to the bonded portion in response to application of the load. The second lower un-bonded section may be coupled to the bonded portion to move relative to the bonded portion and the first lower un-bonded section in response to application of the load. The third lower un-bonded section may be coupled to the bonded portion to move relative to the bonded portion, the first lower un-bonded section, and the second lower un-bonded section in response to application of the load.

In some embodiments, the un-bonded portion may further includes a first upper un-bonded section, a second upper un-bonded section, and a third upper un-bonded section. The first upper un-bonded section may be coupled to the bonded portion to move relative to the bonded portion in response to application of the load. The second upper un-bonded section may be coupled to the bonded portion to move relative to the bonded portion and the first upper un-bonded section in response to application of the load. The third upper un-bonded section may be coupled to the bonded portion to move relative to the bonded portion, the first upper un-bonded section, and the second upper un-bonded section in response to application of the load.

In some embodiments, the bonded portion may include a first bonded section and a second bonded section. The second bonded section may be located between the third lower and upper un-bonded sections. The second upper un-bonded section may be located between the third upper un-bonded section and the first upper un-bonded section. The second lower un-bonded section may be located between the third lower un-bonded section and the first lower un-bonded section.

In some embodiments, the composite component may have a load vs. deflection curve including, in series, a first segment, a second segment, a third segment, and a fourth segment. The first segment may be provided by the first lower and upper un-bonded sections and may have a first slope. The second segment may be provided by the second lower and upper un-bonded sections and may have a second slope. The third segment may be provided by the third upper and lower un-bonded sections and may have a third slope. The fourth segment may be provided by the second bonded section and may have a fourth slope.

In some embodiments, the first slope may be greater than the second slope. The third slope may be greater than the second slope. The fourth slope may be greater than the second and the third slopes. The first slope and the fourth slope may be about equal.

In some embodiments, the composite component may further comprise a component mount coupled to the un-bonded portion. The component mount may be configured to apply the load which is a pre-loading of the un-bonded portion.

In some embodiments, the composite component may further comprise a component mount coupled to the un-bonded portion. The load may include a first force and a second force. The first force may be applied by the component mount to the un-bonded portion. The second force may be applied to the bonded portion in a direction opposite the first force.

In some embodiments, the composite component may have a load vs. deflection curve including, in series, a first segment, a second segment, a third segment, a fourth segment, and a fifth segment. The first segment may be provided by the first lower and upper un-bonded sections and may have a first slope. The second segment may be provided by the second lower and upper un-bonded sections and may have a second slope. The third segment may be provided by the third upper and lower un-bonded sections and may have a third slope. The fourth segment may be provided by the second bonded section and may have a fourth slope. The fifth section may be provided by the first, second, and third upper and lower sections and the bonded portion.

In some embodiments, the first slope may be greater than the second slope. The third slope may be greater than the second slope. The third slope may be greater than the second and the third slopes. The first and second slopes may be about equal. The fifth slope may be less than the second slope.

In some embodiments, the composite component may further comprise a component mount coupled to the un-bonded portion. The load may include a first force, a second force, and a third force. The first force may be applied to the un-bonded portion in a first direction by the component mount. The second force may be applied to the bonded portion in the first direction. The third force may be applied to the bonded portion in a second direction opposite the first direction.

In some embodiments, the bonded portion may include a first bonded section and a second bonded section. The second bonded section may be appended to the first bonded section to extend away from the first bonded section.

In some embodiments, the un-bonded portion may include a first un-bonded section, a second un-bonded section, and a third un-bonded section. The first un-bonded section may be appended to the second bonded section to move relative to the second bonded section in response to application of the load. The second un-bonded section may be appended to the second bonded section to move relative to the second bonded section and the first un-bonded section in response to application of the load. The third un-bonded section may be appended to the second bonded section to move relative to the second bonded section, the first un-bonded section, and the second un-bonded section in response to application of the load.

In some embodiments, the third un-bonded section may be coupled to the first bonded section to translate relative to the first bonded section. The third un-bonded section may be appended to the second bonded section to pivot relative to the second bonded section, the second un-bonded section, and the first un-bonded section.

In some embodiments, the second un-bonded section may be coupled to the third un-bonded section to translate relative to the third un-bonded section. The second un-bonded section may be appended to the second bonded section to pivot relative to the second bonded section, the third un-bonded section, and the first un-bonded section.

In some embodiments, the first un-bonded section may be coupled to the second un-bonded section to translate relative to the second un-bonded section, the third un-bonded section, and second bonded section. The first un-bonded section may be appended to the second bonded section to pivot relative to the second bonded section, the second un-bonded section, and the third un-bonded section.

In some embodiments, the third un-bonded section may be located between the first bonded section and the second un-bonded section. The second un-bonded section may be located between the third un-bonded section and the first un-bonded section.

In some embodiments, the composite component may have a load vs. deflection curve including, in series, a first segment, a second segment, a third segment, and a fourth segment. The first segment may be provided by the first un-bonded section and may have a first slope. The second segment may be provided by the second un-bonded section and may have a second slope. The third segment may be provided by the third un-bonded section and may have a third slope. The fourth segment may be provided by the bonded portion and may have a fourth slope.

In some embodiments, the second slope may be greater than the first slope. The third slop may be greater than the fourth slope. The fourth slope may be greater than the third slope.

In some embodiments, the third un-bonded section may be located between the first bonded section and the second un-bonded section. The second un-bonded section may be located between the third un-bonded section and the first un-bonded section.

In some embodiments, the composite component may have a load vs. deflection curve including, in series, a first segment, a second segment, a third segment, and a fourth segment. The first segment may be provided by the first un-bonded section and may have a first slope. The second segment may be provided by the second un-bonded section and may have a second slope. The third segment may be provided by the third un-bonded section and may have a third slope. The fourth segment may be provided by the bonded portion and have a fourth slope.

In some embodiments, the second slope may be greater than the first slope. The third slope may be greater than the fourth slope. The fourth slope may be greater than the third slope.

In some embodiments, the composite component may further comprise a component mount. The component mount may be coupled to the un-bonded portion to move therewith. In some embodiments, the component mount may be a hinge.

In some embodiments, the composite component may have a load vs. deflection curve including, in series, a first segment and a second segment. The first segment may be provided by the un-bonded portion and may have a first slope. The second segment may be provided by the bonded portion and may have a second slope. The second slope may be greater than the first slope.

These and other features of the present disclosure will become more apparent from the following description of the illustrative embodiments.

BRIEF DESCRIPTION OF THE DRAWINGS

FIG. 1 is a diagrammatic view of a first embodiment of a compliant composite component in accordance with the present disclosure showing that the compliant composite component includes a bonded portion at a right side and an un-bonded portion along a left side that includes, from bottom to top, a first un-bonded section, a second un-bonded section, and a third un-bonded section and showing how the un-bonded portion responds as increasing load is applied going down the sheet;

FIG. 2 is a graph of load (N) vs. deflection (mm) of the compliant composite component of FIG. 1 showing how each un-bonded section provides for deflection of the compliant composite component as load increases;

FIG. 3 is a diagrammatic view of another embodiment of a compliant composite component in accordance with the present disclosure showing that the compliant composite component includes a bonded portion at a right side and an un-bonded portion along a left side that includes, from bottom to top, a first lower un-bonded section, a second lower un-bonded section, and a lower third un-bonded section, a third upper un-bonded section, a second upper un-bonded section, and a first upper un-bonded section and showing how the un-bonded portion responds to pre-loading of the compliant composite component by a component mount;

FIG. 4 is a graph of load (N) vs. deflection (mm) of the compliant composite component of FIG. 3 showing how each un-bonded section provides for deflection of the compliant composite component as load increases due pre-loading the compliant composite component;

FIG. 5 is a diagrammatic view of the compliant composite component of FIG. 3 showing how the composite compliant component responds to a different loading scenario as increasing load is applied going down the sheet;

FIG. 6 is a graph of load (N) vs. deflection (mm) of the compliant composite component of FIG. 5 showing how each un-bonded section provides for deflection of the compliant composite component as load increases;

FIG. 9 is a diagrammatic view of yet another embodiment of a compliant composite component in accordance with the present disclosure showing that the compliant composite component includes a bonded portion at left and right sides and an un-bonded portion therebetween and the un-bonded portion includes, from bottom to top, a first un-bonded section, a second un-bonded section, and a third un-bonded section and showing how the un-bonded portion responds as increasing load is applied going down the sheet;

FIG. 10 is a graph of load (N) vs. deflection (mm) of the compliant composite component of FIG. 9 showing how each un-bonded section provides for deflection of the compliant composite component as load increases;

DETAILED DESCRIPTION OF THE DRAWINGS

Figure 7:
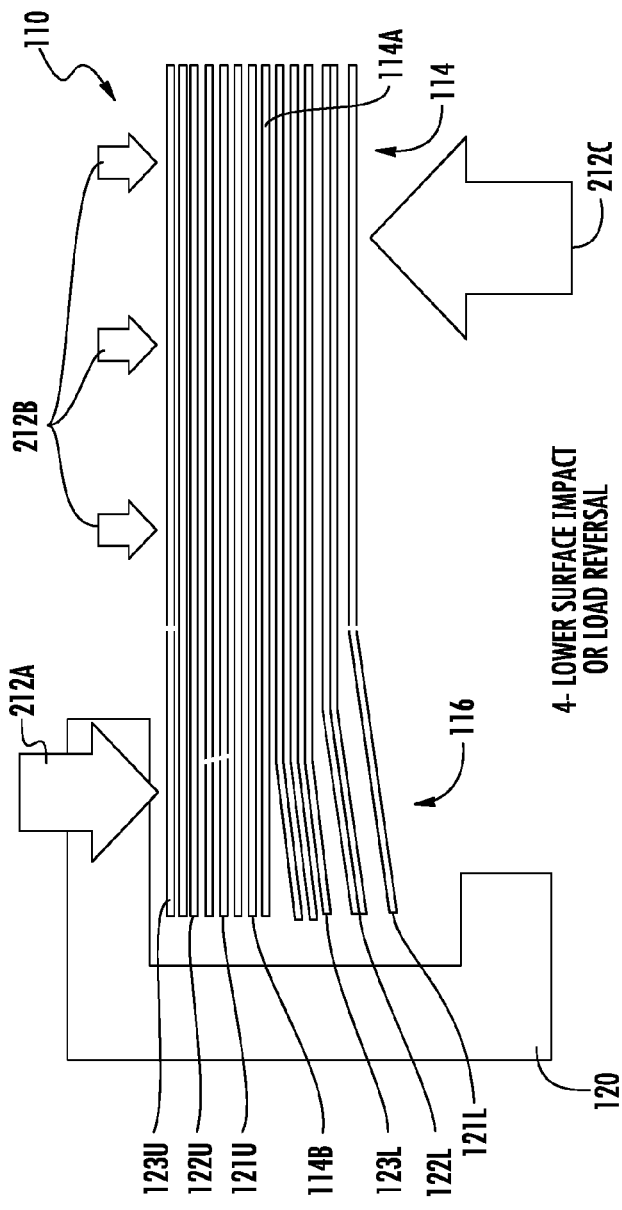
FIG. 7 is a diagrammatic view of the compliant composite component of FIGS. 3 and 5 showing how the composite compliant component responds to an impact load or a reversal of load direction.

For the purposes of promoting an understanding of the principles of the disclosure, reference will now be made to a number of illustrative embodiments illustrated in the drawings and specific language will be used to describe the same.

A compliant composite component 10 in accordance with the present disclosure is shown, for example, in FIG. 1 undergoing application of an increasing load 12. The compliant composite component 10 includes a bonded portion 14 and an un-bonded portion 16 as shown in FIG. 1. The bonded portion 14 is made from a Ceramic Matrix Composite (CMC) material. In one example, the CMC material is a laminate material comprising several layers of fiber bonded together by a ceramic matrix. The un-bonded portion 16 is also made from a CMC material. The un-bonded portion 16 is appended to the bonded portion 14 to move relative to the bonded portion 14 in response to application of the load 12. As a result, the compliant composite component 10 deforms in a controlled manner without fracture or damage to the compliant composite component 10. In one example, the compliant composite component 10 may be a segment of a segmented blade track for a gas turbine engine, a turbine blade, or a turbine vein.

As shown, for example, in FIG. 1, the un-bonded portion 16 includes a first un-bonded section 21, a second un-bonded section 22, and a third un-bonded section 23. The first un-bonded section 21 is coupled to the bonded portion 14 to move relative to the bonded portion 14 in response to application of the load 12. The second un-bonded section 22 is coupled to the bonded portion 14 to move relative to the bonded portion 14 and the first un-bonded section 21 in response to application of the load 12. The third un-bonded section 23 is coupled to the bonded portion 14 to move relative to the bonded portion 14, the first un-bonded section 21, and the second un-bonded section 22 in response to application of the load 12. While three un-bonded sections 21, 22, 23 are shown, more or less un-bonded sections may be used in accordance with the present disclosure.

In one illustrative example, the third un-bonded section 23 is located between the bonded portion 14 and the second un-bonded section 22. The second un-bonded section 22 is located between the third un-bonded section 23 and the first un-bonded section 21.

The compliant composite component 10 has a load vs. deflection curve 18 including, in series, a first segment 31, a second segment 32, a third segment 33, and a fourth segment 34 as shown, for example, in FIG. 2. The first segment 31 is provided by the first un-bonded section 21 and has a first slope. The second segment 32 is provided by the second un-bonded section 22 and has a second slope. The third segment 33 is provided by the third un-bonded section 23 and has a third slope. The fourth segment 34 is provided by the bonded portion 14 and has a fourth slope.

As shown, for example, in FIG. 1, the second slope is greater than the first slope. The third slope is greater than the fourth slope. The fourth slope is greater than the third slope.

Another embodiment of a compliant composite component 110 in accordance with the present disclosure is shown, for example, in FIG. 3 undergoing application of an increasing load 112. The compliant composite component 110 includes a bonded portion 114 and an un-bonded portion 116 as shown in FIG. 3. The bonded portion 114 is made from a Ceramic Matrix Composite (CMC) material. In one example, the CMC material is a laminate material comprising several layers of fiber bonded together by a ceramic matrix. The un-bonded portion 116 is also made from a CMC material. The un-bonded portion 116 is appended to the bonded portion 114 to move relative to the bonded portion 114 in response to application of the load 112. As a result, the compliant composite component 110 deforms in a controlled manner without fracture or damage to the compliant composite component 110.

As shown, for example, in FIG. 3, the un-bonded portion 116 includes a first lower un-bonded section 121L, a second lower un-bonded section 122L, and a third lower un-bonded section 123L. The first lower un-bonded section 121L is coupled to the bonded portion 114 to move relative to the bonded portion 114 in response to application of the load 112. The second lower un-bonded section 122L is coupled to the bonded portion 114 to move relative to the bonded portion 114 and the first lower un-bonded section 121L in response to application of the load 112. The third lower un-bonded section 123L is coupled to the bonded portion 114 to move relative to the bonded portion 114, the first lower un-bonded section 121L, and the second lower un-bonded section 122L in response to application of the load 112. While three lower un-bonded sections 121L, 122L, 123L are shown, more or less un-bonded sections may be used in accordance with the present disclosure.

The un-bonded portion 116 further includes a first upper un-bonded section 121U, a second upper un-bonded section 122U, and a third upper un-bonded section 123U as shown in FIG. 3. The first upper un-bonded section 121U is coupled to the bonded portion 114 to move relative to the bonded portion 114 in response to application of the load 112. The second upper un-bonded section 122U is coupled to the bonded portion 114 to move relative to the bonded portion 114 and the first upper un-bonded section 122U in response to application of the load 112. The third upper un-bonded section 123U is coupled to the bonded portion 114 to move relative to the bonded portion 114, the first upper un-bonded section 121U, and the second upper un-bonded section 122U in response to application of the load 112.

The bonded portion 114 includes a first bonded section 114A and a second bonded section 1148. The second bonded section 1146 is located between the third lower and upper un-bonded sections 123L, 123U. The second upper un-bonded section 122U is located between the third upper un-bonded section 123U and the first upper un-bonded section 121U. The second lower un-bonded section 122L is located between the third lower un-bonded section 123L and the first lower un-bonded section 121L.

The compliant composite component 110 has a load vs. deflection curve 118 including, in series, a first segment 131, a second segment 132, a third segment 133, and a fourth segment 134 as shown, for example, in FIG. 4. The first segment 131 is provided by the first upper and lower un-bonded sections 121U, 121L and has a first slope. The second segment 132 is provided by the upper and lower second un-bonded section 122U, 122L and has a second slope. The third segment 133 is provided by the upper and lower third un-bonded section 123U, 123L and has a third slope. The fourth segment 134 is provided by the bonded portion 114 and has a fourth slope.

In one illustrative example, the first slope is greater than the second slope. The third slope is greater than the second slope. The fourth slope is greater than the second and third slopes. The first slope is about equal to the fourth slope.

The compliant composite component 110 further includes a component mount 120 as shown in FIG. 3. The component mount 120 is coupled to the un-bonded portion 116 and configured to apply the load 112 which is a pre-loading of the un-bonded portion 116 as shown in FIG. 3. In another illustrative example, the load 112 includes a first force 112A applied by the component mount 120 to the un-bonded portion 116. The load 112 further includes a second force 112B applied to the bonded portion 114 in a direction opposite the first force 112A as shown in FIG. 5.

Figure 8:
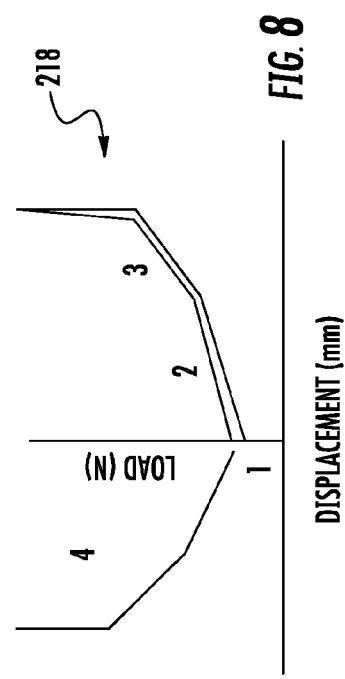
FIG. 8 is a graph of load (N) vs. deflection (mm) of the compliant composite component of FIG. 7 showing how each un-bonded section provides for deflection of the compliant composite component as load changes.

In still yet another illustrative example, a load 212 is applied to the compliant composite component 110 as shown in FIG. 7. The load 212 includes a first force 212A applied to the un-bonded portion 116 in a first direction by the component mount 120. The load 212 further includes a second force 212B applied to the bonded portion 114 in the first direction. The load 212 yet includes a third force 212C applied to the bonded portion 114 in a second direction opposite the first direction as shown in FIG. 7. In this example, the load 212 is the result of an impact to the compliant composite component 110 or a load reversal. As associated load vs. deflection curve 218 is shown in FIG. 8.

Another embodiment of a compliant composite component 310 in accordance with the present disclosure is shown, for example, in FIG. 9 undergoing application of an increasing load 312. The compliant composite component 310 includes a bonded portion 314 and an un-bonded portion 316 as shown in FIG. 9. The bonded portion 314 is made from a Ceramic Matrix Composite (CMC) material. In one example, the CMC material is a laminate material comprising several layers of fiber bonded together by a ceramic matrix. The un-bonded portion 316 is also made from a CMC material. The un-bonded portion 316 is appended to the bonded portion 314 to move relative to the bonded portion 314 in response to application of the load 312. As a result, the compliant composite component 310 deforms in a controlled manner without fracture or damage to the compliant composite component 110.

The bonded portion 314 includes a first bonded section 314A and a second bonded section 314B. The second bonded section 314B is appended to the first bonded section 314A to extend away from the first bonded section 314A as shown in FIG. 9.

The un-bonded portion 316 includes a first un-bonded section 321, a second un-bonded section 322, and a third un-bonded section 323 as shown in FIG. 9. The first un-bonded section 321 is appended to the second bonded section 314B to move relative to the second bonded section 314B in response to application of the load 312. The second un-bonded section 322 is appended to the second bonded section 314B to move relative to the second bonded section 314B and the first un-bonded section 321 in response to application of the load 312. The third un-bonded section 323 is appended to the second bonded section 314B to move relative to the second bonded section 314B, the first un-bonded section 321, and the second un-bonded section 322 in response to application of the load 312.

The third un-bonded section 323 is coupled to the first bonded section 314A to translate relative to the first bonded section 314A. The third un-bonded section 323 is appended to the second bonded section 314B to pivot relative to the second bonded section 314B, the second un-bonded section 322, and the first un-bonded section 321 as shown in FIG. 9. The second un-bonded section 322 is coupled to the third un-bonded section 323 to translate relative to the third un-bonded section 323. The second un-bonded section 322 is appended to the second bonded section 314B to pivot relative to the second bonded section 314B, the third un-bonded section 323, and the first un-bonded section 321.

As shown, for example, in FIG. 9, the first un-bonded section 321 is coupled to the second un-bonded section 322 to translate relative to the second un-bonded section 322, the third un-bonded section 323, and second bonded section 314B. The first un-bonded section 321 is appended to the second bonded section 314B to pivot relative to the second bonded section 314B, the second un-bonded section 322, and the third un-bonded section 323.

The third un-bonded section 323 is located between the first bonded section 314A and the second un-bonded section 322. The second un-bonded section 322 is located between the third un-bonded section 323 and the first un-bonded section 321.

The compliant composite component 310 has a load vs. deflection curve 318 as shown, for example, in FIG. 10. The load vs. deflection curve 318 includes, in series, a first segment 331, a second segment 332, a third segment 333, and a fourth segment 334. The first segment 331 is provided by the first un-bonded section 321 and has a first slope. The second segment 332 is provided by the second un-bonded section 322 and has a second slope. The third segment is provided by the third un-bonded section 323 and having a third slope. The fourth segment 334 is provided by the bonded portion 314 and has a fourth slope. The second slope is greater than the first slope. The third slop is greater than the fourth slope. The fourth slope is greater than the third slope.

In one illustrative example, the third un-bonded section 323 is located between the first bonded section 314A and the second un-bonded section 322 as shown in FIG. 9. The second un-bonded section 322 is located between the third un-bonded section 323 and the first un-bonded section 321.

Figure 11:
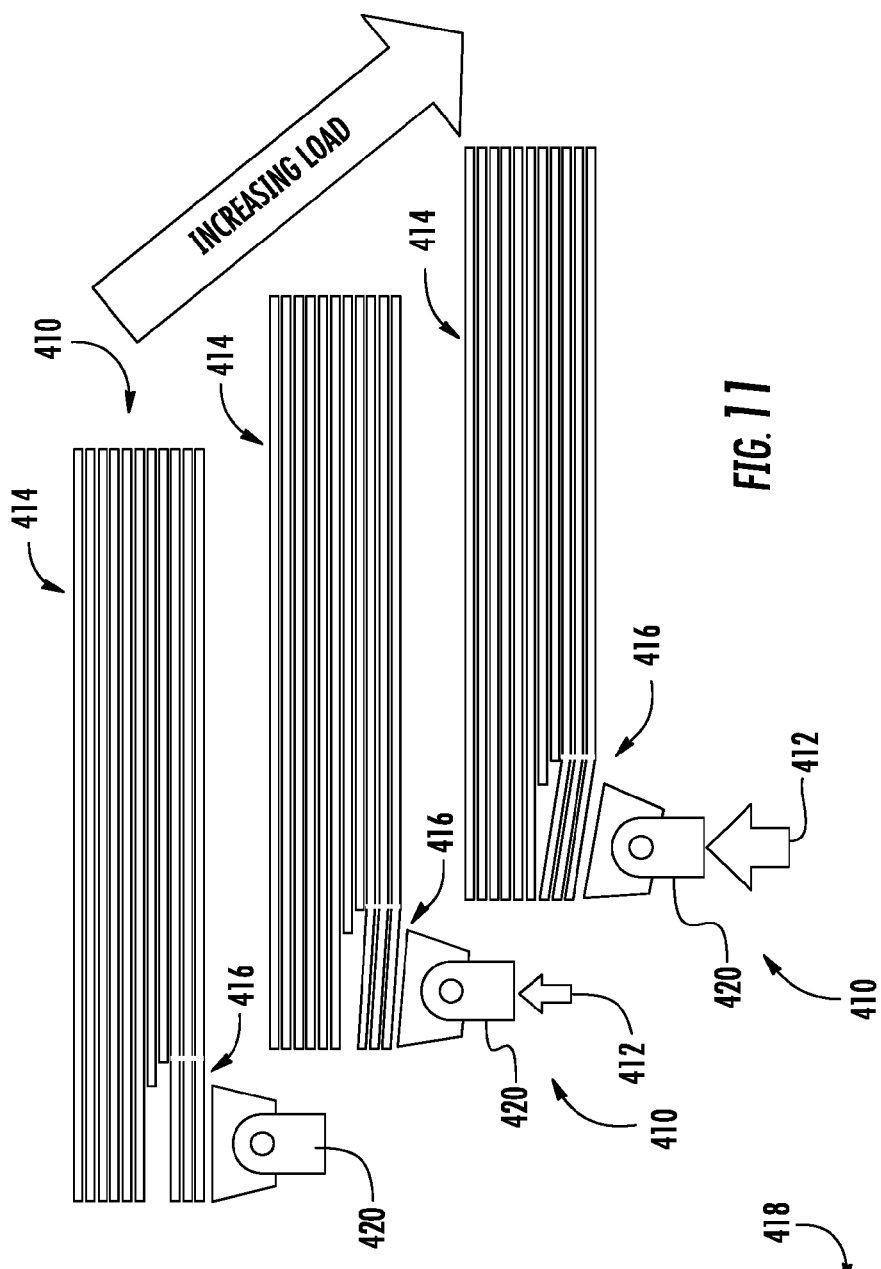
FIG. 11 is a diagrammatic view of yet another embodiment of a compliant composite component in accordance with the present disclosure showing that the compliant composite component includes a bonded portion at a right side and an un-bonded portion at a left side where the compliant composite component is coupled to a hinge and showing how the un-bonded portion responds as increasing load is applied going down the sheet.

Another embodiment of a compliant composite component 410 in accordance with the present disclosure is shown, for example, in FIG. 11 undergoing application of an increasing load 412. The compliant composite component 410 includes a bonded portion 414, an un-bonded portion 416, and component mount 420 as shown in FIG. 11. In one illustrative example, the component mount 420 is a hinge as shown in FIG. 11. The bonded portion 414 is made from a Ceramic Matrix Composite (CMC) material. In one example, the CMC material is a laminate material comprising several layers of fiber bonded together by a ceramic matrix. The un-bonded portion 416 is also made from a CMC material. The un-bonded portion 416 is appended to the bonded portion 414 to move relative to the bonded portion 414 in response to application of the load 412. As a result, the compliant composite component 410 deforms in a controlled manner without fracture or damage to the compliant composite component 410.

Figure 12:
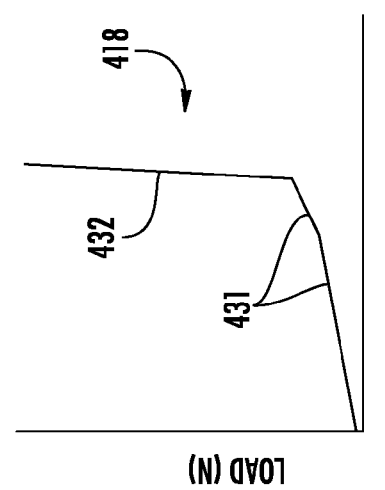
FIG. 12 is a graph of load (N) vs. deflection (mm) of the compliant composite component of FIG. 11 showing how the un-bonded portion provides for deflection of the compliant composite component as load increases.

The compliant composite component 410 has a load vs. deflection curve 418 as shown, for example, in FIG. 12. The load vs. deflection curve 418 includes, in series, a first segment 431 and a second segment 432. The first segment 431 is provided by the un-bonded portion 416 and has a first slope. The second segment 432 is provided by the bonded portion 414 and has a second slope. The second slope is greater than the first slope.

A method of fabricating a Ceramic Matrix Composite (CMC) component increases local compliance to improve load transfer from the CMC component to adjacent components. CMC components are relatively stiff (40 MSI/1280 GPa typical young's modulus) and metal components have vastly different Coefficients of Thermal Expansion (CTE). As a result, introducing load uniformity to the CMC component may be difficult. In addition, manufacturing tolerances complicate stresses at load interfaces between CMC components and metal components. While metal components may yield or creep to accommodate these loads, composite components may crack and be subject to subsequent degradation as a result. While un-bonded or de-bonded sections of a composite component are typically considered as defects, the un-bonded sections of the composite components of the present disclosure are created intentionally to exploit the additional compliance.

The compliance of the attachment region may be designed for the desired compliance characteristics. This includes the potential to create progressive or variable compliance designs. In most instances the compliant areas will be designed to contact other layers as load is applied. By limiting deflection of the compliant material, stresses may be controlled to achieve the desired life (fatigue, etc.) characteristics.

A method of fabricating a compliant composite component in accordance with the present disclosure includes multiple operations. The compliant composite component may be fabricated during manufacture of the base component or through post-manufacture machining. The compliant composite component may be fabricated during composite process.

One example of a method of fabricating a compliant composite component is discussed below. The method comprises the operations of inserting a material that is oxidized, etched, dissolved, vaporized, sublimated, or otherwise removed after some stage of composite processing to leave a void. For example, graphoil (a carbon sheet made from flake graphite) may be inserted temporarily then removed mechanically or by oxidation. The method further includes applying a material (e.g., boron nitride, carbon, molybdenum disulfide) that impairs the bond between lamina or sections of the material.

The method further includes using multi-layered textile pre-forms. The multi-layered pre-forms may be locally woven to allow layer separation or cut after textile operations are complete to permit manipulation. Multi-layer textiles may be created with very localized connections that are broken after processing or broken during application of the load as part of the design. These joining points will hold the textile open during processing.

The method further includes delaminating forcibly the composite. The composite may be delaminated through mechanical means (wedging or applying interlaminar tension) or thermal shock means to produce the desired compliance.

The method further includes inserting a textile that does not bond well with the primary material. Thermal mismatch of fibers and limited contact area can both result in poorly bonded or unbounded areas.

The method further includes omitting material locally to create an intentional void in the material. As an example, an area could be removed from several layers of the textile or simply not woven into a three-dimensional textile.

The method further includes inserting a material that survives processing to some stage. However, the thermal expansion difference between this material and the composite may result in delamination during cool down or thermal cycling In a laminated structure, such as shown in FIG. 1, the design should attempt to limit interlaminar stresses like tension and shear. Interlaminar compression is preferred to minimize the risk of delamination.

In some instances where the contact between surfaces varies in angle, it may be desirable to incorporate a pivot point or other means to maintain relatively constant contact area to minimize surface point stresses. It may be preferred in some instances to have matching compliance and geometry on the contact surface so that both materials deflect and maintain constant contact. Even when matched compliance is not possible, similar compliance may be provided.

The compliant composite component of the present disclosure may be applied to high stiffness organic and metal matrix composites. The compliant composite component maximizes uniformity of load transfer through a range of operating conditions leading to maximize performance and component life.

The compliant composite component provides substantially uniform contact between components. Uniform contact is maintained or minimal gaps occur with attachment of the compliant composite component to seal or limit gas or liquid flow.

The compliant composite component provides for pre-loading upon assembly so that a component is always under load. As a result, wear and vibration may be minimized.

The compliant composite component may allow for significantly greater deflections that may allow a component to rotate or translate significantly. Such movement may be useful when an abnormal overstress occurs to an adjacent component that creates contact with the CMC component which may move to minimize damage to both components. If an impact occurs (for instance FaD to a vane), the CMC component may dissipate some of the energy through deflection and minimize component damage. Flexing of the compliant composite component may provide for improved performance.

The compliant composite component of the present disclose demonstrates better load transfer and lower stress states which provides less damage during overloads and demonstrate more consistent part fit and performance. The compliant composite component also provides for improved sealing. As a result, the compliant composite component may have longer component life, reduced component weight, or lower acquisition cost as a result of reduced need for tight tolerances and consequently higher production yield.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A composite component comprising
   a bonded portion made from a ceramic matrix composite material and
   an un-bonded portion made from the ceramic matrix composite material and coupled to the bonded portion to move relative to the bonded portion in response to application of a load to cause the composite component to deform in a controlled manner without fracture of the composite component,
   wherein the un-bonded portion includes a first un-bonded section coupled to the bonded portion to move relative to the bonded portion in response to application of the load, a second un-bonded section coupled to the bonded portion to move relative to the bonded portion and the first un-bonded section in response to application of the load, and a third un-bonded section coupled to the bonded portion to move relative to the bonded portion, the first un-bonded section, and the second un-bonded section in response to application of the load.

2. The composite component of claim 1, wherein the third un-bonded section is located between the bonded portion and the second un-bonded section and the second un-bonded section is located between the third un-bonded section and the first un-bonded section.

3. The composite component of claim 2, wherein the composite component has a load vs. deflection curve including, in series, a first segment provided by the first un-bonded section and having a first slope, a second segment provided by the second un-bonded section and having a second slope, a third segment provided by the third un-bonded section and having a third slope, and a fourth segment provided by the bonded portion and having a fourth slope.

4. The composite component of claim 3, wherein the second slope is greater than the first slope, the third slope is greater than the fourth slope, and the fourth slope is greater than the third slope.

5. A composite component comprising
   a bonded portion made from a ceramic matrix composite material and
   an un-bonded portion made from the ceramic matrix composite material and coupled to the bonded portion to move relative to the bonded portion in response to application of a load to cause the composite component to deform in a controlled manner without fracture of the composite component,
   wherein the un-bonded portion includes a first lower un-bonded section coupled to the bonded portion to move relative to the bonded portion in response to application of the load, a second lower un-bonded section coupled to the bonded portion to move relative to the bonded portion and the first lower un-bonded section in response to application of the load, and a third lower un-bonded section coupled to the bonded portion to move relative to the bonded portion, the first lower un-bonded section, and the second lower un-bonded section in response to application of the load.

6. The composite component of claim 5, wherein the un-bonded portion further includes a first upper un-bonded section coupled to the bonded portion to move relative to the bonded portion in response to application of the load, a second upper un-bonded section coupled to the bonded portion to move relative to the bonded portion and the first upper un-bonded section in response to application of the load, and a third upper un-bonded section coupled to the bonded portion to move relative to the bonded portion, the first upper un-bonded section, and the second upper un-bonded section in response to application of the load.

7. The composite component of claim 6, wherein the bonded portion includes a first bonded section and a second bonded section and the second bonded section is located between the third lower and upper un-bonded sections, the second upper un-bonded section is located between the third upper un-bonded section and the first upper un-bonded section, and the second lower un-bonded section is located between the third lower un-bonded section and the first lower un-bonded section.

8. The composite component of claim 7, wherein the composite component has a load vs. deflection curve including, in series, a first segment provided by the first lower and upper un-bonded sections and having a first slope, a second segment provided by the second lower and upper un-bonded sections and having a second slope, a third segment provided by the third upper and lower un-bonded sections and having a third slope, and a fourth segment provided by the second bonded section having a fourth slope and the first slope is greater than the second slope, the third slope is greater than the second slope, fourth slope is greater than the second and the third slopes, and the first slope and the fourth slope are about equal.

9. The composite component of claim 8, further comprising a component mount coupled to the un-bonded portion and configured to apply the load which is a pre-loading of the un-bonded portion.

10. The composite component of claim 8, further comprising a component mount coupled to the un-bonded portion and the load includes a first force applied by the component mount to the un-bonded portion and a second force applied to the bonded portion in a direction opposite the first force.

11. The composite component of claim 7, wherein the composite component has a load vs. deflection curve including, in series, a first segment provided by the first lower and upper un-bonded sections and having a first slope, a second segment provided by the second lower and upper un-bonded sections and having a second slope, a third segment provided by the third upper and lower un-bonded sections and having a third slope, and a fourth segment provided by the second bonded section having a fourth slope, and a fifth section provided by the first, second, and third upper and lower section and the bonded portion, the first slope is greater than the second slope, the third slope is greater than the second slope, third slope is greater than the second and the third slopes, the first and second slopes are about equal, and the fifth slope is less than the second slope.

12. A composite component comprising
a bonded portion made from a ceramic matrix composite material and
an un-bonded portion made from the ceramic matrix composite material and coupled to the bonded portion to move relative to the bonded portion in response to application of a load to cause the composite component to deform in a controlled manner without fracture of the composite component,
wherein the bonded portion includes a first bonded section and a second bonded section and the second bonded section is appended to the first bonded section to extend away from the first bonded section, and
wherein the un-bonded portion includes a first un-bonded section appended to the second bonded section to move relative to the second bonded section in response to application of the load, a second un-bonded section appended to the second bonded section to move relative to the second bonded section and the first un-bonded section in response to application of the load, and a third un-bonded section appended to the second bonded section to move relative to the second bonded section, the first un-bonded section, and the second un-bonded section in response to application of the load.

13. The composite component of claim 12, wherein the third un-bonded section is coupled to the first bonded section to translate relative to the first bonded section and appended to the second bonded section to pivot relative to the second bonded section, the second un-bonded section, and the first un-bonded section.

14. The composite component of claim 13, wherein the second un-bonded section is coupled to the third un-bonded section to translate relative to the third un-bonded section and appended to the second bonded section to pivot relative to the second bonded section, the third un-bonded section, and the first un-bonded section.

15. The composite component of claim 14, wherein the first un-bonded section is coupled to the second un-bonded section to translate relative to the second un-bonded section, the third un-bonded section, and the second bonded section and appended to the second bonded section to pivot relative to the second bonded section, the second un-bonded section, and the third un-bonded section.

16. The composite component of claim 14, wherein the first un-bonded section is coupled to the second un-bonded section to translate relative to the second un-bonded section, the third un-bonded section, and the second bonded section and appended to the second bonded section to pivot relative to the second bonded section, the second un-bonded section, and the third un-bonded section and the third un-bonded section is located between the first bonded section and the second un-bonded section and the second un-bonded section is located between the third un-bonded section and the first un-bonded section, the composite component has a load vs. deflection curve including, in series, a first segment provided by the first un-bonded section and having a first slope, a second segment provided by the second un-bonded section and having a second slope, a third segment provided by the third un-bonded section and having a third slope, and a fourth segment provided by the bonded portion and having a fourth slope, and the second slope is greater than the first slope, the third slope is greater than the fourth slope, and the fourth slope is greater than the third slope.

17. The composite component of claim 12, wherein the third un-bonded section is located between the first bonded section and the second un-bonded section and the second un-bonded section is located between the third un-bonded section and the first un-bonded section, the composite component has a load vs. deflection curve including, in series, a first segment provided by the first un-bonded section and having a first slope, a second segment provided by the second un-bonded section and having a second slope, a third segment provided by the third un-bonded section and having a third slope, and a fourth segment provided by the bonded portion and having a fourth slope, and the second slope is greater than the first slope, the third slope is greater than the fourth slope, and the fourth slope is greater than the third slope.

18. A composite component comprising
a bonded portion made from a ceramic matrix composite material and
an un-bonded portion made from the ceramic matrix composite material and coupled to the bonded portion to move relative to the bonded portion in response to application of a load to cause the composite component to deform in a controlled manner without fracture of the composite component, and a hinge coupled to the un-bonded portion to move therewith, wherein the composite component has a load vs. deflection curve including, in series, a first segment provided by the un-bonded portion and having a first slope and a second segment provided by the bonded portion and having a second slope, and the second slope is greater than the first slope.

* * * * *